(No Model.) 8 Sheets—Sheet 1.

W. S. BURROUGHS.
CALCULATING MACHINE.

No. 388,118. Patented Aug. 21, 1888.

Attest:
Court. A. Cooper,
A. E. F. Hansmann.

Inventor:
Wm. S. Burroughs,
By Foster & Freeman
attys.

(No Model.) 8 Sheets—Sheet 2.

W. S. BURROUGHS.
CALCULATING MACHINE.

No. 388,118. Patented Aug. 21, 1888.

Fig. 3.

Attest:
Court A. Cooper,
A. C. Fansmann.

Inventor:
Wm. S. Burroughs,
By Foster & Freeman
attys.

(No Model.) 8 Sheets—Sheet 3.

W. S. BURROUGHS.
CALCULATING MACHINE.

No. 388,118. Patented Aug. 21, 1888.

Fig. 4.

Attest:
Cou.H.A.Cooper.
A.E.J.Fansmann.

Inventor:
Wm. S. Burroughs,
By Foster & Freeman,
attys.

(No Model.) 8 Sheets—Sheet 4.

W. S. BURROUGHS.
CALCULATING MACHINE.

No. 388,118. Patented Aug. 21, 1888.

Fig. 5.

Attest:
Court A Cooper
A. E. Fansmann.

Inventor:
Wm S Burroughs
By Foster + Freeman
attys.

(No Model.) 8 Sheets—Sheet 5.

W. S. BURROUGHS.
CALCULATING MACHINE.

No. 388,118. Patented Aug. 21, 1888.

Fig. 6.

(No Model.) 8 Sheets—Sheet 7.

W. S. BURROUGHS.
CALCULATING MACHINE.

No. 388,118. Patented Aug. 21, 1888.

Attest:
Court. A. Cooper.
A. E. J. Hansmann.

Inventor:
Wm. S. Burroughs,
By Foster & Freeman
attys.

N. PETERS, Photo-Lithographer, Washington, D. C.

(No Model.) 8 Sheets—Sheet 8.

W. S. BURROUGHS.
CALCULATING MACHINE.

No. 388,118. Patented Aug. 21, 1888.

Attest:
Court A. Cooper,
A. C. Fansmann.

Inventor:
Wm. S. Burroughs,
By Foster & Freeman
attys.

United States Patent Office.

WILLIAM S. BURROUGHS, OF ST. LOUIS, MISSOURI, ASSIGNOR TO THE AMERICAN ARITHMOMETER COMPANY, OF SAME PLACE.

CALCULATING-MACHINE.

SPECIFICATION forming part of Letters Patent No. 388,118, dated August 21, 1888.

Application filed March 17, 1886. Serial No. 195,583. (No model.)

*To all whom it may concern:*

Be it known that I, WILLIAM S. BURROUGHS, a citizen of the United States, residing at St. Louis, in the State of Missouri, have invented certain new and useful Improvements in Calculating-Machines, of which the following is a specification.

My invention relates to that class of calculating-machines in which numbers are transferred to registers on striking-keys bearing such numbers; and my invention consists in the combination of a series of keys, one or more series of number-wheels, (one series being a recorder,) and connections, as fully described hereinafter, whereby each number struck is at once set up on the register and also printed, and whereby the sum of all the numbers is printed below such numbers as required.

The machine, as shown in the drawings, is provided with two indicators, one being a recorder, I, and the other a register, H. The register H is formed by properly numbering the cogs or teeth of a series of wheels, the figures on each wheel extending from 0 to 9, and these wheels turn independently of each other upon a rocking and sliding shaft, $a$, constituting a register-carrier. As shown, each wheel A is a toothed wheel, the figures being on the ends of the teeth, as in the machine for which I applied for Letters Patent on the 10th of January, 1885, Serial No. 152,485. By turning the wheels upon their shaft the different peripheral numbers may be brought opposite the sight-opening $x$ of the sight-plate X, Fig. 3, so as to indicate any sum which may result from the automatic movement of the wheels. The movements of each wheel requisite to bring any number opposite the sight-opening are effected as the result of the striking of a series of keys, D, arranged in line with each other upon a key-board, D'', supported by the frame of the machine and numbered in succession in rows from bottom to top from 1 to 9, and between each key and the wheel operated therefrom are arranged devices which I include under the general terms "wheel-actuating devices," designating those devices between the wheels and the stops, and "connections," designating those devices between the stops and the keys, which serve to determine the movement of the wheel when any particular key is struck, these devices being of such a character that the proper wheel will be moved one step as the result of striking the key numbered 1, two steps as the result of striking the key numbered 2, and so on.

I will now describe the above-referred-to devices.

Each wheel A is operated directly by a curved rack, $b$, Fig. 7, which forms part of a rack-lever, B, vibrating upon a shaft, C, having its bearing in the side frames, C' C², of the machine, and the extent to which each wheel is turned will depend upon the extent of the movement of the rack, which movement is regulated by the adjustment of a series of stops, as will be hereinafter set forth, the said adjustment being effected by the operation of the keys D through their connections.

It is generally necessary that the wheels A shall be turned in but one direction by the action of the racks, and I therefore provide means for throwing the racks and wheels out of gear as the racks move in one direction and into gear prior to their reverse movement. This may be effected by withdrawing the racks from the wheels prior to the descent of the racks; but I prefer to move the wheels out of connection with the racks, which is effected by extending the shaft $a$ into slot-bearings $x'$ in the side frames, Figs. 1 and 2, which permits the shaft to be moved radially to and from the racks, springs $a^2$, connected to the side frames, C' C², and to the shaft $a$, tending to hold the wheels in gear with the racks.

Figure 3:
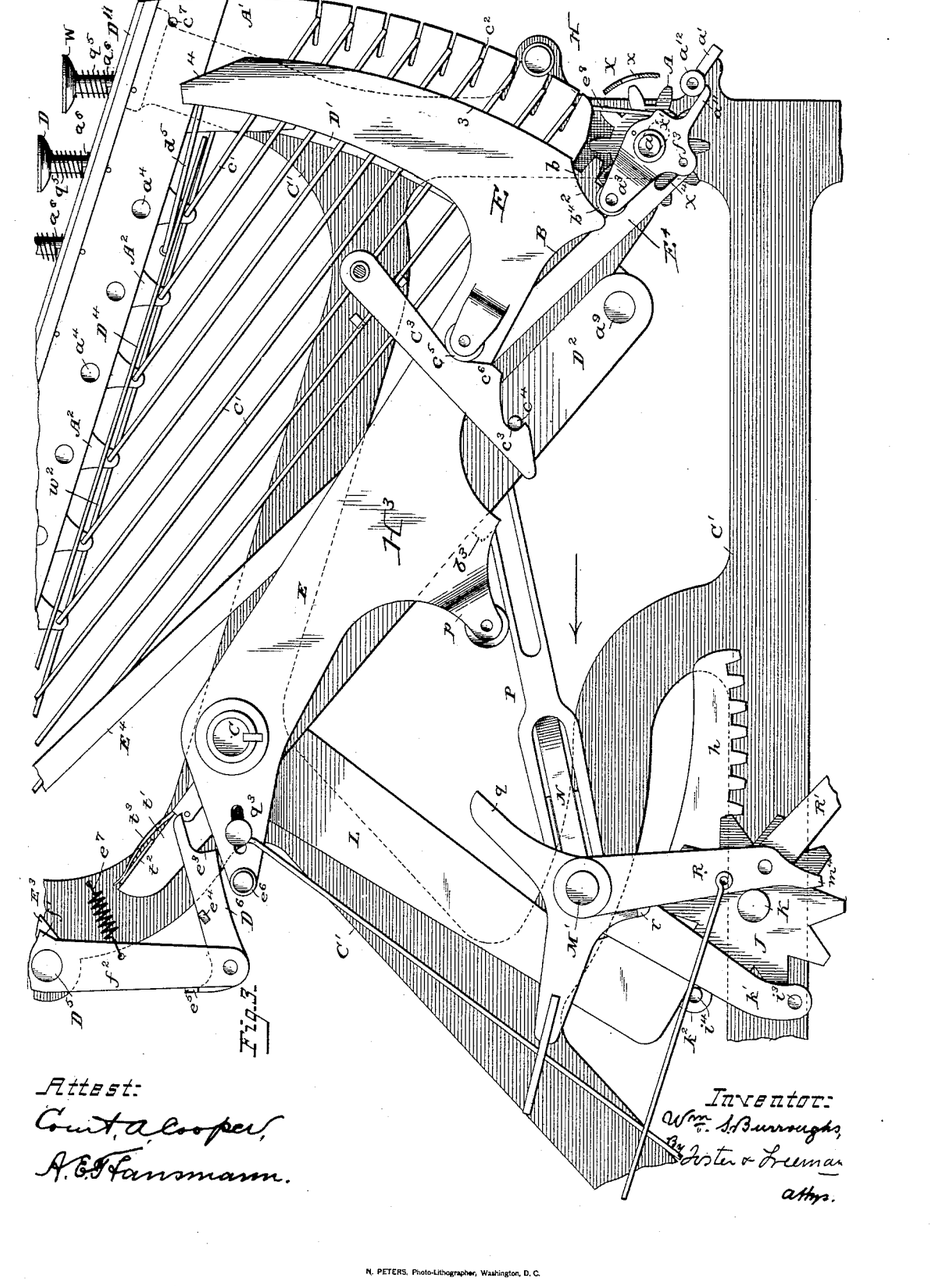
Fig. 3 is a sectional elevation of part of the machine, showing the parts in their normal position before beginning operations.
Figures 7, 10:
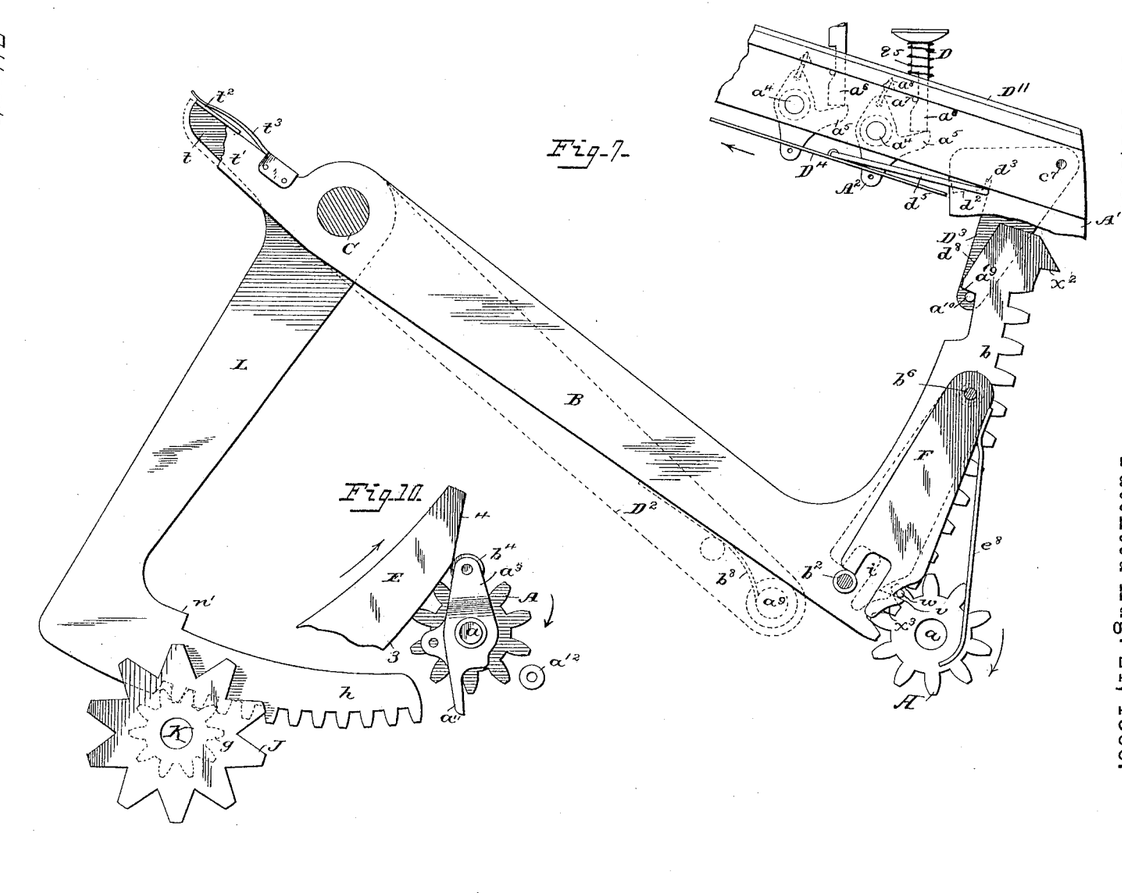
Fig. 7, a view showing one of the rack-levers and some of the parts connected directly therewith.
Fig. 10 is a detached view of part of the register-frame and cam.

Guide-lips $a^{11}$ upon side arms, $a^3$, of the register-frame, Fig. 3, bear against friction-rollers $a^{12}$ at the sides of the machine and prevent the rocking of the shaft $a$ in one direction, while permitting its radial adjustment, but permit the shaft to turn in the other direction to the position shown in Fig. 10. On depressing any key a device for regulating the turning of the co-operating wheel is so set that the adjacent rack will move until arrested by the said device, and the extent of the movement which takes place after the wheels have been drawn from connection with the rack will determine the extent to which the wheel will be rotated by the upward movement of the rack after the two have been brought into gear, and the device connected with the keys 1 is arranged to permit the rack to descend but a single step, while the device connected with the keys 2 3 4, &c., are arranged each to permit a corresponding extent of movement of the rack. Different devices may be employed for thus regulating from the keys the movements of the racks. In the drawings each device is a stop, $c$, Figs. 4 and 5, extending from a rod, $c'$, through a slot or guide, $c^2$, in a stop-plate, A', which is dependent from an upper part of the frame of the machine, hanging in a position parallel with and close to the rack, the slots being of such length that whenever one of the stops $c$ is drawn to the inner end of its slot the said stop will be in position to be struck by a shoulder, $x^2$, at the upper end of the rack, thereby limiting its movement. Normally all the stops $c$ are in forward positions, and the rack can descend and the shoulder $x^2$ will pass all the stops until it strikes one that has been carried inward. Each stop-rod $c'$ is jointed to the lower end of a crank-lever, A², Figs. 4, 7, and 12, suspended from a cross-bar, $a^4$, extending into the side frames of the machine, and an arm, $a^5$, of each lever A² occupies a position beneath the stem $a^6$ of one of the keys D, which stem slides freely in a vertical opening in the key-board D''. The shank of each key merely rests on the lever A² below a spring, $q^5$, lifting each key after the finger of the operator is removed. By pressing upon any key D the lever A² beneath the same is swung in the direction of its arrow, Fig. 4, and the stop $c$ of the rod $c'$, connected to said lever, is thereby drawn into the end of its slot or guide $c^2$ in position to be struck by the shoulder of the adjacent rack.

Figure 4:
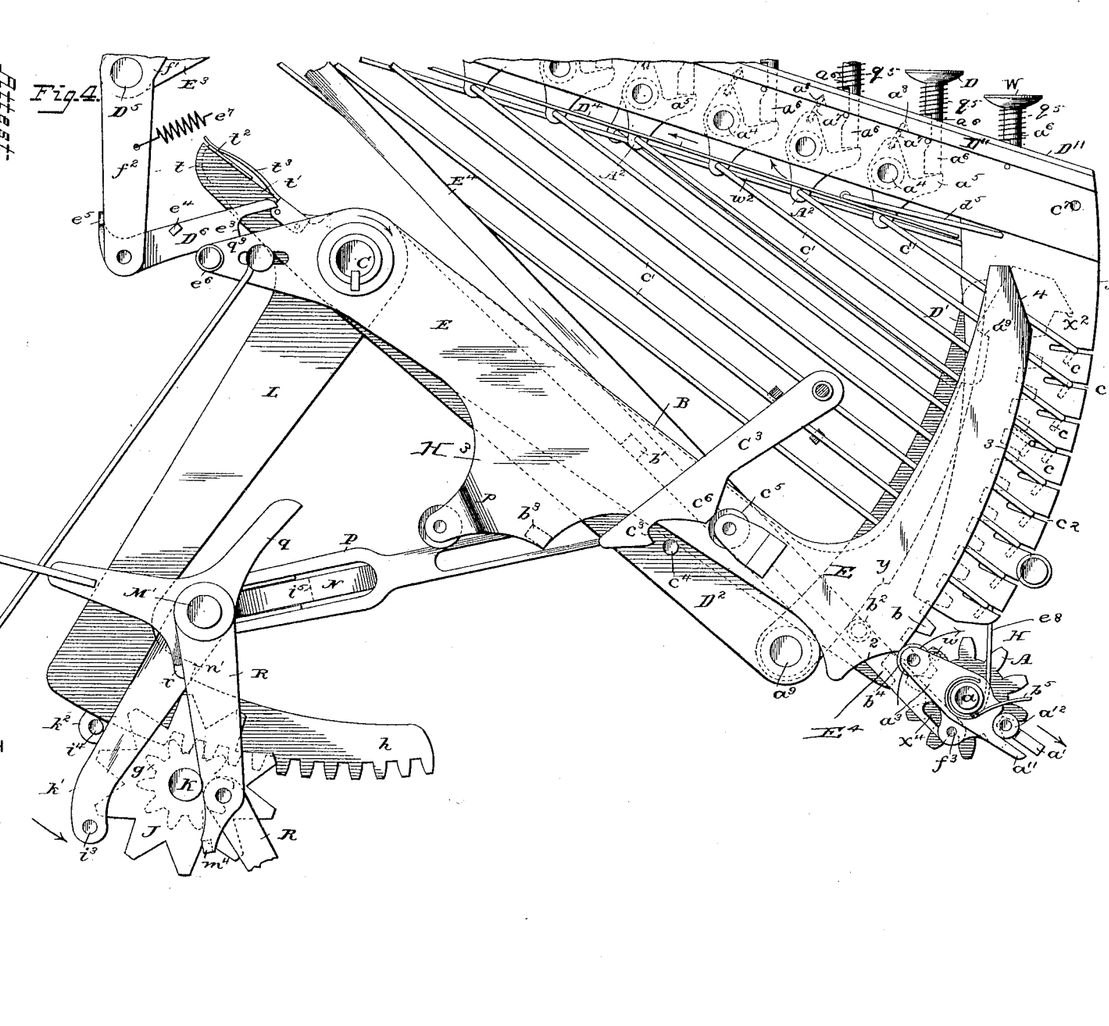
Fig. 4, the same as Fig. 3, the parts in position as the rack-frame begins its descent.
Figure 5:
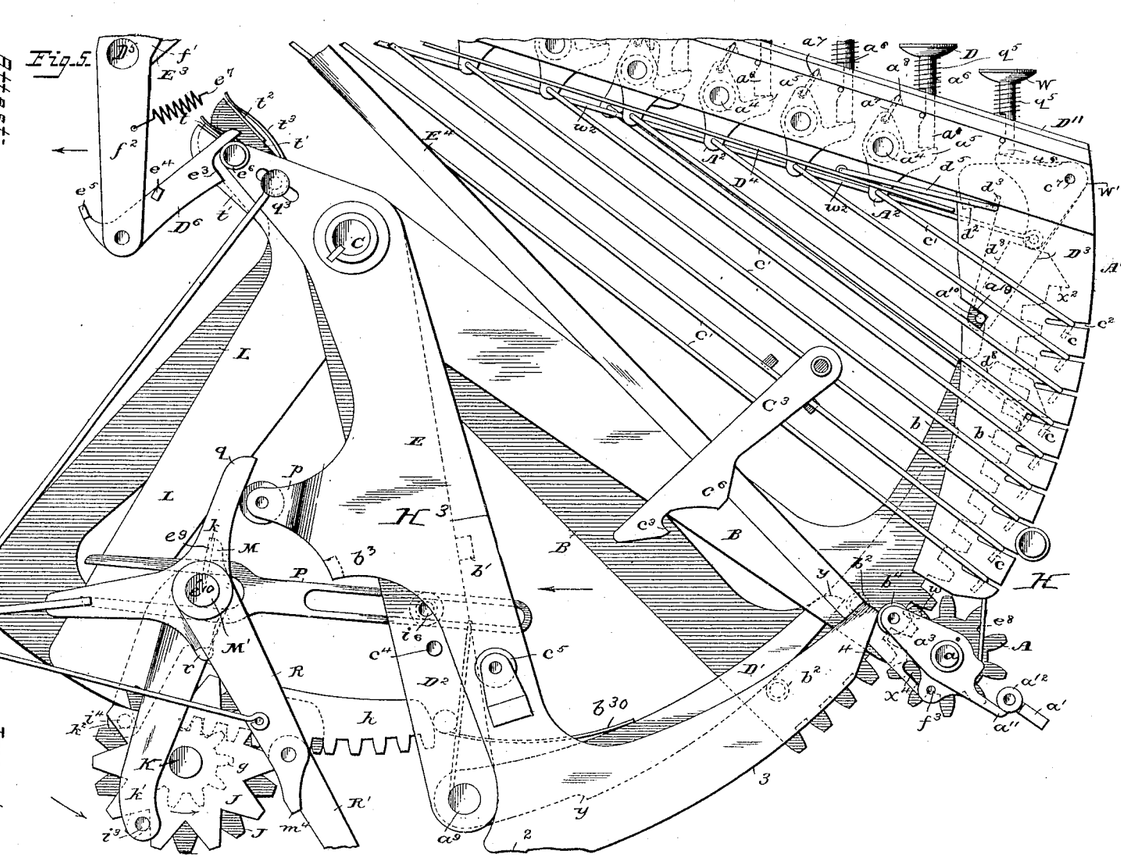
Fig. 5, the same, the rack-frame and other parts at the limit of their lower motion.
Figure 12:
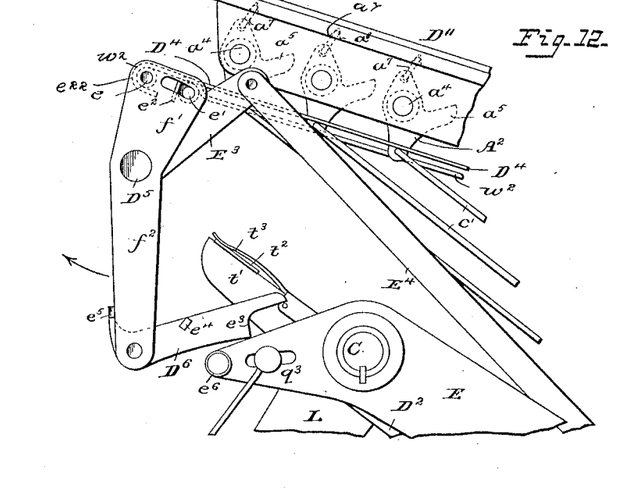
Fig. 12 is a detached view of devices connected with the keys.

To maintain the levers A² in any position to which they are set, a spring, $a^7$, Figs. 4, 5, and 12, bent to the shape of a ring passing through a hole in the upper end of each lever A², is seated to rock in a notch, $a^8$, in the under side of the key-plate, directly above the axis of the shaft $a^4$. By this arrangement the bearing-point of the spring upon the lever A² is carried to one side or the other of the fulcrum of the lever, and the spring, compressed as the bearing-points approach, tends to expand as the lever moves to either side and to hold the lever in whichever position it may be set, thereby also locking the stop in its position in such manner as to prevent easy displacement.

By the above-described arrangement no direct action is imparted to the racks by the keys, which solely set the stops $c$ in position to be struck by the shoulders $x^2$, and the racks are thrown down by positive movements of the operator, who rocks the shaft C by means of the lever C⁵ to effect this result, and also to lift the racks after the wheels A have been thrown into gear therewith. The rack-levers, instead of being operated upon directly by the shaft C, are moved by a rack carrier or restorer, H³, in the form of an operating-frame having frictional or yielding connections with the levers. Thus a pin or projection, $b^3$, Figs. 5 and 7, extending from the side of each rack-lever, is struck by a shoulder, $y$, upon an arm, D', pivoted to a cross-bar, $a^9$, which is carried by two side arms, D², each swinging upon the shaft C. The arms D² are not swung directly by the shaft C, but are carried by side levers, E, secured to the shaft C, and each provided with lugs $b'$ $b^3$, Fig. 4, which, when brought by the vibration of the lever against the edges of the arms D², carry the latter with the levers E, the said levers E, arms D' and D², and cross-bar $a^9$ constituting the rack-carrying frame H³. The lugs $b'$ $b^3$ are separated to such an extent as to permit a play of the levers E independently of the arms D², for the purpose set forth hereinafter. When the shaft C, after the stops have been set, is turned by the operator in the direction of the arrow, Fig. 4, by means of the lever C⁵, the frame will first move to throw the register out of gear, as shown in said Fig. 4, and then each shoulder $y$ of each arm D', Figs. 4 and 5, will be brought against the corresponding pin, $b^3$, of the adjacent rack, Fig. 3, and the latter will be carried down until its shoulder $x^2$ strikes the particular stop-pin $c$ which has been set inward by the action of one of the keys, the arm D', however, continuing its further downward movement as its shoulder $y$ escapes from the pin $b^3$, as shown in Fig. 5, a spring, $b^{30}$, insuring the strong frictional contact of the shoulder and pin, but yielding to permit the arm D' to swing back when the movement of the pin is arrested. The downward movement of the levers E is also made the means of throwing the wheels A out of gear with the racks. This results from the action of a cam-edge, 2, Figs. 3 and 4, on each lever E, which edge is brought against a friction-roller, $b^4$, carried by the parts connected with the register, as arms $a^3$ on the shaft $a$, the cam-edge 2 forcing forward the register in the direction of the arrow, Fig. 4, as the lever E begins its downward movement, and the curved edge 3 of the lever maintaining the parts in their position until the cam-lever reaches the position shown in Fig. 5, when a terminal cam-edge, 4, will permit the register to move back until the wheels A are in gear with the rack. When the wheels A are carried forward, they are maintained in relative positions by a crossbar, $a'$, supported by the frame, which is received between the teeth of the wheels and prevents them from turning. (See Figs. 4 and 5.)

The levers E can be raised without throwing out the wheels A, as the contact of the cam-edges 4 of the levers and the friction-rollers $b^4$ will cause the arms $a^3$ of the register-frame to swing in the direction of the arrow, Fig. 10, to the position shown, so that without sliding the shaft will rock and the wheels will remain in gear with the racks and be turned thereby. When the cam-edges 2 are carried above the friction-rollers $b^4$, a spring, $b^5$, Fig. 4, coiled around the shaft $a$ and connected at one end to the latter and at the other to the arm $a^3$, will restore the latter to the position shown in Fig. 3. In this position the contact of fingers $a^{11}$ of the arms $a^3$ with bearing-rollers $a^{12}$ at the ends of the bar $a'$ will prevent the swinging of the shaft upon the subsequent downward movement of the cam-levers.

Figure 6:
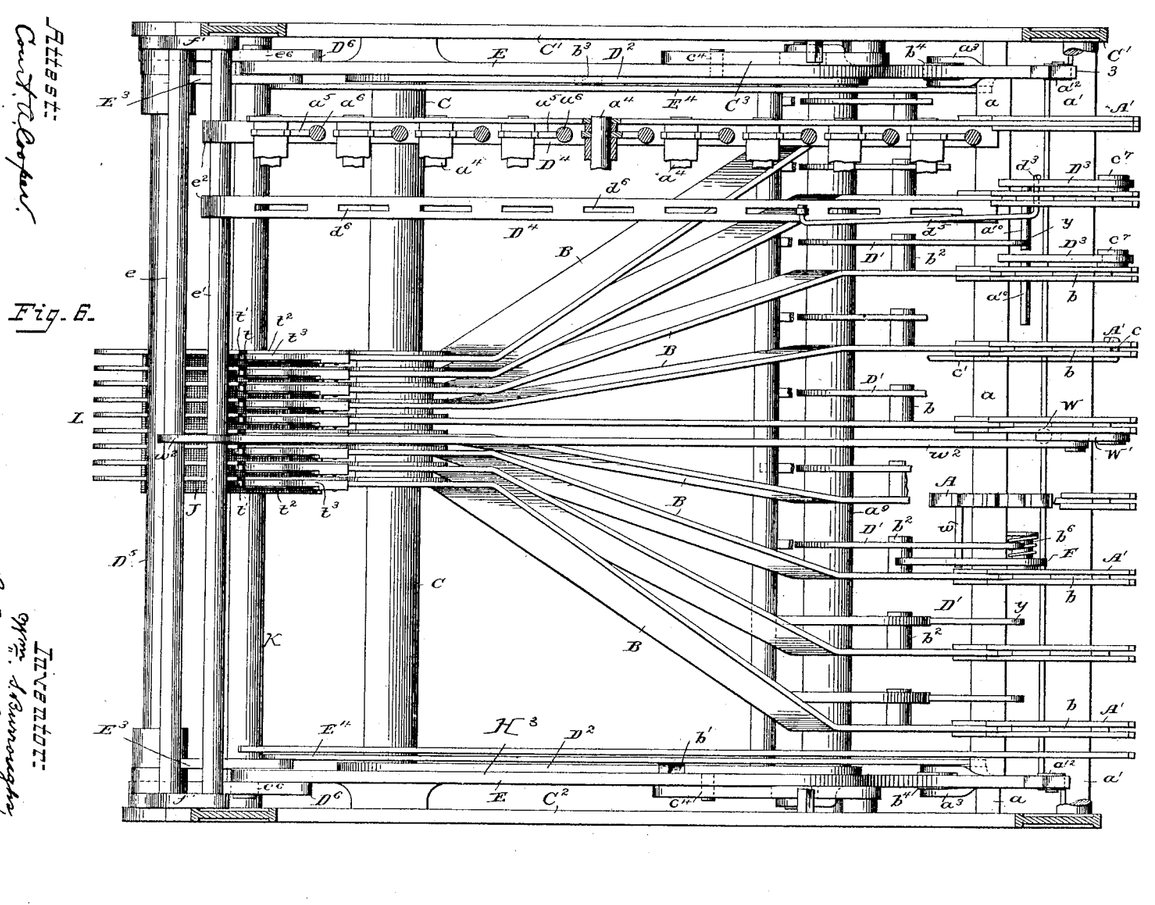
Fig. 6, a sectional plan view showing parts on different planes.

While the stops $c$ limit the downward movements of the racks, other stops limit their upward movements. These latter stops—which I term "detents"—to distinguish them—may be constructed in different ways. As shown, each detent is a forked arm, F, Figs. 6 and 7, pivoted at $b^6$ to the adjacent stop-plate A', as shown in Fig. 6, in which only one detent is shown in order to better illustrate other parts. The detent makes contact with the stud $b^2$, Fig. 7, projecting laterally from the rack, and the rack-levers are held in this position by the upward pressure of springs $b^8$, Fig. 7, carried by the cross-bar $a^9$, and the entire rack-carrying frame is maintained in its highest position by means of two detents or catches, $C^3$, Fig. 4, each pivoted to one of the side frames and having a projection, $c^6$, and a shoulder, $c^3$, which engages with a pin, $c^4$, upon the adjacent arm $D^2$ and supports the frame in its elevated position. At the same time the register is thrown forward by the action of the cam-edges 2 of the cam-levers, friction-rollers $c^5$, carried by the cam-levers E, are brought against the projections $c^6$ upon the catches $C^3$, and the latter are thrown off and away from the pin $c^4$, Fig. 4; but the arms $D^2$ will not drop at once in consequence of the frictional contact of the pivoted arms D' with the studs $b^2$. The continued descent of the cam-levers effected by the operator's turning the shaft C brings the lugs $b'$ against the upper edges of the arms $D^2$, Fig. 4, just as the wheels A are thrown out of contact with the racks $b$, and the cam-levers and arms $D^2$, with the cross-bar $a^9$ and pivoted arms D', are then carried downward together toward the position shown in Fig. 5. As the shoulder $y$ of each pivoted arm D' is brought against the stud $b^2$ of the adjacent rack, the latter, if it has been released by the action of one of the keys, will be carried down until its shoulder $x^2$ strikes the stop which has been set by the said key, the shoulders $y$ slipping over the studs $b^2$, while the racks not released by the action of the keys will retain their elevated positions.

Each rack is maintained normally in its elevated position by a retainer, $D^3$, Figs. 5 and 7, consisting of a plate pivoted at $c^7$ to the frame of the machine, carrying a pin, $a^{10}$, which may be brought beneath a shoulder, $a^{19}$, of the rack when the latter is in its elevated position, and each detent is provided with an inclined edge or shoulder, $d^2$.

Across and beneath an inclined edge, $d^2$, of each retainer $D^3$ extends laterally a finger, $d^3$, Figs. 6 and 7, upon the end of a rod, $d^5$, pivoted to one of a series of bars $D^4$, Fig. 6. Each bar $D^4$ extends beneath the key-plate and has a series of slots, $d^6$, each receiving the lower end of one of the crank-levers $A^2$. When any one of the levers $A^2$ is vibrated by the depressing of its key, it carries the bar $D^4$ in the direction of its arrow, Fig. 7, and the finger $d^3$, by its action on the inclined edge $d^2$, vibrates the retainer $D^3$, so as to carry the stud $a^{10}$ thereof from beneath the shoulder $a^{19}$ of the rack, thereby releasing the latter. The sliding movement of the bar $D^4$ thus imparted by the depression of any one of the keys does not affect the position of the other levers $A^2$, as the slots $b^6$ are of such length as to permit the backward movement of the bar independently of the levers.

Each rack $b$ has an inclined edge, $d^8$, Fig. 7, which on the upward movement of the rack strikes the stud $a^{10}$ until the latter passes the shoulder $a^{19}$, when the retainer will swing outward and bring the stud beneath the shoulder $a^{19}$, locking the rack in its elevated position. As the racks are carried upward a vibrating rod, $e$, or other device is brought to act upon each bar $D^4$, so that all the bars and their connections are restored to their normal positions simultaneously.

The particular means which I have shown for restoring the bars to their positions as the racks are elevated consists of a rock-shaft, $D^5$, Figs. 4, 5, and 12, carrying at each end a lever with arms $f'f^2$, and between the two arms $f'$ extend two rods, $e\ e'$, between which project fingers $e^2$ of all of the bars $D^4$, the space between the rods $e\ e'$ being sufficient to permit any bar $D^4$ to be moved back to its full extent without any movement of the arm $f'$.

To the lower end of each arm $f^2$ is pivoted a pawl, $D^6$, Figs. 4 and 12, having a shoulder, $e^3$, and limited in its vibration by stops $e^4\ e^5$, and a rearwardly-projecting end, $q^3$, of each cam-lever E carries a friction stud, $e^6$, which, when the cam-levers are brought to their lowest position, (shown in Fig. 5,) is brought opposite the shoulder $e^3$ of the pawl $D^6$. When a bar $D^4$, Fig. 12, is thrown back by depressing one of the keys, its finger $e^2$ is brought against the adjacent rod $e$, and when the cam-levers E, after being thrown to their lowest position, are carried upward, the contact of the studs $e^6$ with the shoulders $e^3$ throws the arms $f^2$ outward in the direction of their arrow, Fig. 12, rocking the shaft $D^5$ and vibrating the arms $f'$, so as to bring the rod $e$ against all the fingers $e^2$ and carry forward all of the bars $D^4$ and simultaneously restore all of the levers $A^2$ to their normal position. As the pawls $D^6$ drop, the stops $e^5$ on the pawls strike the arms $f^2$ and arrest the movements of the said pawls, so that the studs $e^6$ pass from contact with the shoulders $e^3$, when springs $e^7$, Figs. 3 and 4, connected to the frame and to the arms $f^2$, restore the latter to the position shown in Figs. 3 and 4.

Figure 9:
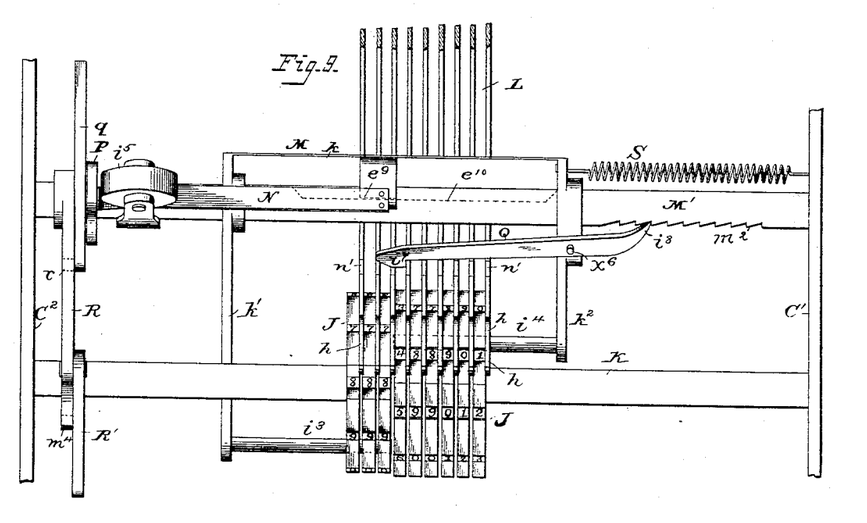

In order to effect what is ordinarily termed "carrying" in arithmetical calculations, I provide means whereby whenever any one wheel A completes a revolution, so as to pass the point at which the figure 9 is exposed at the sight-plate, the next wheel will be moved one step. Heretofore this carrying operation has generally been effected either by the direct transfer of motion from one wheel to the next or by driving the wheels from a drum or otherwise by the direct application of power exerted by the operator.

There are limits to the capacity of any machine embodying the above-described mode of operation, because in enlarging the machine to give it the capacity to indicate a long series of figures or totals embracing many figures its size is increased to such an extent as to render its use impracticable. To avoid this difficulty I move each wheel A by the power of the operator, and additional thereto use a separate independent motor for each rack-lever, capable of automatically moving it one step whenever it is required to carry a number from one column to another. Such a motor may be gravity, or a spring of any kind compressed on the reverse movement. As one means of effecting this result, I render adjustable the before-described detents F, which temporarily limit the upward movements of the racks and move them out of place automatically at times to permit a slight automatic additional movement of the racks. For instance, when a wheel is about to complete its revolution, carrying the figure 9 from the sight-plate, the adjacent detent is displaced, so as to permit the next wheel, previously arrested by said detent, to move one step, and I effect this latter movement of the second wheel not directly by the act of the operator, but by means of a spring, gravity, or other motor operating automatically and independently of the operator to move the rack-lever. By this arrangement and mode of operation I am enabled to move any one or more of the wheels directly by the operator to turn a wheel the number of steps indicated by the key depressed by the operator, and I am enabled simultaneously to impart to the wheel thus moved the capacity to move an additional step under the action of the independent motor, whereby the operation of carrying is automatically effected simultaneously with the movements imparted directly from the operator, as in a machine for which I filed an application January 10, 1885, Serial No. 152,485, wherein, however, the rack-levers were not moved by the motor as herein set forth. Different means may be employed for thus automatically transferring the motion. It also may be effected at different times. For instance, the wheels may be turned directly by the downward movements of the racks, and each additional step required for carrying may then be imparted by dropping the rack one step; or, as in the machine now being described, the racks may be dropped without moving the wheels, and may be then raised each to the proper extent to impart the total movement required.

In the construction shown the detents F, which define the normal positions of the racks, are in the form of forked arms, and the extended movement of one step of each rack is permitted by swinging the detent so as to bring the space or notch $i$, Fig. 7, between the forks into a position above the stud $b^2$. The swinging of each detent F, in one direction as shown in dotted lines, Fig. 7—namely, inwardly—is effected by means of a spring, $e^8$, Figs. 4, 5, and 7, extending from the detent into a position to be struck by the register-shaft $a$ when the register is moved outward, Fig. 4, and in the other direction the movement is derived from the wheels A, as by a pin, $w$, projecting from the side of the adjacent wheel A in a position to strike an inclined face, $x^3$, upon the outer fork of the detent F.

The pin $w$ is so arranged that it will strike the face $x^3$ as the figure 9 upon the wheel passes from opposite the sight-opening, the detent F being thus swung inward to bring its slot $i$ above the stud $b^2$ of the rack which operates the next wheel. The operation of the next wheel does not necessarily ensue at once upon the adjustment of the detent F; but when the cam-levers E are raised to their elevated positions, carrying with them the arms $D^2$, the springs $b^8$ are brought against the rack-levers B and compressed, and the rack-levers are elevated until the arms $D^2$ reach their upper position, after which the action of the springs $b^8$ will raise one step farther any of the rack-levers that are rendered capable of this movement by the previous adjustment of the detent F, before described. The racks thus receive their movements in two ways: first, by the action of the operator to an extent which lifts them to their normal positions or depresses them, and, secondly, by the action of an independent motor, which lifts to a limited further extent such of the racks as must be moved to carry a number from one column into the next higher column. In the machine shown the rocking of the shaft C is effected by means of the lever or handle $C^5$, Fig. 1, secured to the end of the shaft outside of the casing G, which incloses the entire frame, and the shaft D⁵, Fig. 7, is rocked by a handle, D⁷, also upon the end of the shaft outside the case, when it is necessary to rock the shaft by hand in printing the sum registered, as described hereinafter.

While I have described the register H as carried by a shaft sliding in slotted bearings, the register may swing upon a pivot, as shown in my aforesaid application for Letters Patent, and different devices from those described may be used for throwing the wheels A and racks into and out of gear. It will also be obvious that various mechanical substitutes for the catches C³ and retainers D³ may be used.

Although I have described one construction of stops for limiting the downward movements of the racks and as sliding in guide-slots c², the said stops may be otherwise constructed in any suitable manner, so as to present movable obstructions connected by any suitable connections with the keys to be set thereby, and the keys may be connected positively to the levers A², as in my application Serial No. 152,485, or to the rods connected with the stops; and the slotted bar or frame for restoring the keys to position simultaneously when the racks are raised may be constructed and connected to be operated upon the movement of the rack-bars in different ways obvious to any skilled mechanic.

Any suitable friction or yielding contact between the rack-levers and their operating-restorer H³ may be employed. For instance, there may be an ordinary frictional washer between the hub of each rack-lever and the shaft C, so that the turning of the latter will carry with it each rack-lever until the latter is brought against a positive stop; or the racks may be connected by springs or yielding connections to the frame, so as to move therewith until the racks strike their stops.

Instead of moving the wheels A into and out of contact with the racks, the latter may be in constant gear with pinions arranged by the sides of the wheels and provided with pawls, so as to turn the wheels when they move upon the upward motion of the racks, and so as to turn independently of the wheels when the racks descend.

Where it is desired to print the sum total of the various numbers added upon the machine by depressing the keys indicating such numbers, the printing may be effected directly from the faces or types of the wheels of the register H; but as the wheels of the register H are separated to the extent required by the interposed connections, the numbers would be separated or displayed to too great an extent upon the sheet for convenient use. I therefore prefer to employ the register H simply as a sight-register, and to use a separate printing-recorder, Fig. 11, in which the printing-wheels J are arranged closely side by side, and to connect the printing-wheels with the racks controlled by the stops through the medium of connections which converge (see Fig. 6) from the racks to the printing-wheels, thereby operating the latter, notwithstanding the limited space which they occupy.

While it is not absolutely necessary to separate the wheels of the register H to the extent shown, it is necessary to arrange the keyboard over an extended space sufficient to permit the ready manipulation of the keys in operating the instrument, and the converging connections between the keys and the printing-recorder permit this extended arrangement of the keys, while bringing the printing-wheels into a compact compass. When the register H is necessarily employed for printing, the wheels thereof may be brought into close proximity and the connections may diverge therefrom to the keys.

Each wheel J of the recorder is secured to a pinion, g, Fig. 4, turning with the recorder-wheel loosely upon a shaft, K, and gearing with the teeth of a rack, h, constituting part of a rack-lever, L, which may be connected directly to or form a part of one of the rack-levers B.

Figure 2:
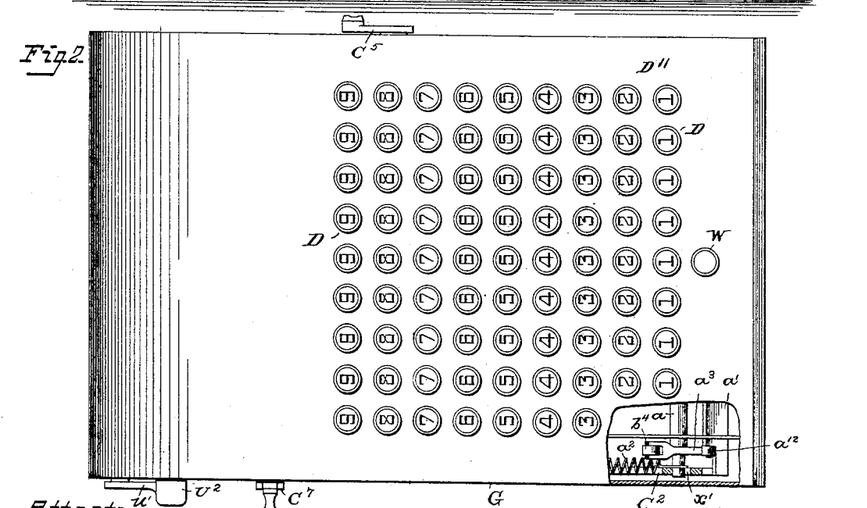
Fig. 2 is a plan, a part broken away.

The figures upon each printing-wheel J correspond with those upon that wheel of the register H with which the same rack-lever is connected, and the wheels J are so arranged and connected with their operating-racks that when one of the racks b is dropped one point, upon depressing the key 1 of its operating series of keys, the figure 1 upon the printing-wheel J will be brought opposite the platen, and when the rack b is dropped two steps upon striking the second key of the series the printing-wheel will be turned to bring the figure 2 opposite the platen, and so on, each printing-wheel being brought back to a position with the figure 0 opposite the platen whenever the racks b are raised to their normal positions. By this means I am enabled to print in succession each number which is transferred to the keyboard. Thus, if it be required to add together the amounts 248, 1,061, and 42, the parts of the machine are all brought to the position illustrated in Fig. 3, and the keys 2, 4, 8 upon the three right-hand series of keys, Fig. 2, are struck, which sets three stops c in position and swings back the three corresponding retainers D³ and releases the corresponding rack-levers. The handle C⁵ is then drawn forward until the parts are in the position shown in Fig. 5, the three rack-levers released by the depression of the keys being thus carried down until they hit their stops, to thereby turn the corresponding wheels J of the recorder until the number 248 is opposite the platen, and then the paper or strip may be brought against the wheel, so as to print and record the amount thus registered. These operations do not turn any of the wheels A, as they are thrown outward on the downward motion of the rack-levers. Upon restoring the parts to the position shown in Fig. 3 the wheels J will all be brought to zero, and the second number, 1,061, is registered by striking the corresponding keys of the first four or right-hand series, which will result in bringing the number 1,061 of the printing-wheels opposite the platen, and which number may then, after the strip has been moved forward, be printed thereon. After the parts have been restored to position, the fourth key of the first series and the second key of the second series are struck, and the number 42 is recorded in the same manner as the other number, and so on, thus producing a recording-strip upon which is printed in succession the various numbers which it is desired to add together.

It will be seen that while the recorder, after each movement of the keys, is brought to a position to record the particular number struck upon the keys, and is then carried back to zero, the sight-register H, after the first number is indicated, does not exhibit the subsequent numbers struck upon the keys, but shows the sum total of the said numbers. If it is desired to print this sum total, it may be printed from the printing-wheels by transferring the amount registered upon the wheels of the sight-register H to the wheels of the printing-register. This transfer is effected as follows: The parts are first brought to the position shown in Fig. 3, with the sum total of all the numbers added exhibited at the sight-opening $x$. All the bars $D^4$ are then drawn back, as described hereinafter, to swing all the retainers $D^3$ and carry all the studs $a^{10}$ from contact with the racks $b$, leaving the latter free. The shaft $a$ is then turned, as before described, so as to remove the bearing-rollers $b^4$, Fig. 10, from the cam-edges 2, that the descent of the cam-levers E shall not push the register H forward, but leave its wheels in gear with the racks. The handle $C^5$ is now drawn forward, thereby carrying down all the rack-levers and turning backward the wheels A. As the pin $w$ of each wheel A thus revolved in a reverse direction strikes a shoulder, $v$, of the adjacent detent F, its rotation is arrested, as is also the descent of the connected rack-lever, so that the extent of the downward movement of each of the latter depends upon the extent to which the wheel A geared therewith can be turned backward before bringing it to zero. The number exposed at the sight-opening always indicates the number of steps between such number and zero, so that if 8 is the exposed number the wheel will turn back eight steps, and the rack will descend eight steps before the pin $w$ strikes the shoulder $v$, and the printing-wheel J will also be turned eight steps, and the figure 8 will be brought opposite the platen. As this result ensues with each wheel A and its corresponding printing-wheel and connections, and as each printing-wheel is thus turned to bring opposite the platen the number corresponding to the number exposed on the corresponding sight-register wheel, and as the numbers thus exposed represent the sum total of all the numbers struck, the number set opposite the platen and then printed on the slip will be the sum total of all the numbers which were previously printed separately on the slip, which thus presents columns of figures with the total below, as in any sum in addition. The retainers $D^3$ are all swung back by pushing back the lever $D^7$, thereby rocking back the shaft $D^5$ and arms $f'$ and bringing the rod $e'$ against the lips $e^2$ of the bars $D^4$. This movement is made the means of rocking the register-shaft $a$ to carry the roller-bearings $b^4$ away from the cam-edges 2, arms $E^3$, projecting from the shaft $D^5$, Fig. 12, being jointed to rods $E^4$, Fig. 4, which are connected to pins $f^3$, projecting from the arms $a^3$ of the shaft, Figs. 3, 4, and 5. To permit the shaft $a$ to swing when the cam edges 2 are brought in contact with the frame, without moving the shaft $D^5$ and its connection, I provide the rods $E^4$ with slots $x^4$, receiving pins $f^3$ and permitting the play of the pins as the register-frame is turned upward to the position shown in Fig. 10.

Where it is desirable to keep the wheels of the register H at zero preliminary to beginning additional computations, this is effected by throwing forward the wheels after they are set for the descent of the racks. This is done by moving the handle $D^7$ forward, so as to move back the bar $E^4$, and thereby pushing on the pins $f^3$ and moving out the shaft $a$.

It will be obvious that the wheels A, constructed as described, serve a twofold purpose: first, as registers, and, second, to transfer or carry the amount in excess of 9 from one column to another. When a sight-register is not required, the wheels need not be numbered, and then constitute carrying or transfer wheels only.

It will be evident that if all the printing-wheels J are at zero before the amount on the wheels A is transferred, and if said amount does not require all the wheels to represent it, the remaining wheels will print ciphers in line with the other numbers. Thus, if there are nine wheels and the number transferred is 92,816, the line printed will present this appearance: 000092816.

As the presence of the ciphers before the other figures is not only useless, but confusing, I provide means for preventing the printing of any but the figures required to represent the sum by preventing the printing contact with the slip of any but the wheels containing figures to be printed. I have used different means for preventing this printing-contact— as, for instance, the interposition of a movable thin blade between the wheels and paper when the latter should not be printed, or the removal of the platen from beneath all but the wheels which are to effect the printing. I prefer, however, to prevent such contact by adjusting the wheels themselves so that those that are not to print have the spaces between the printing-faces opposite the platen.

Figure 8:
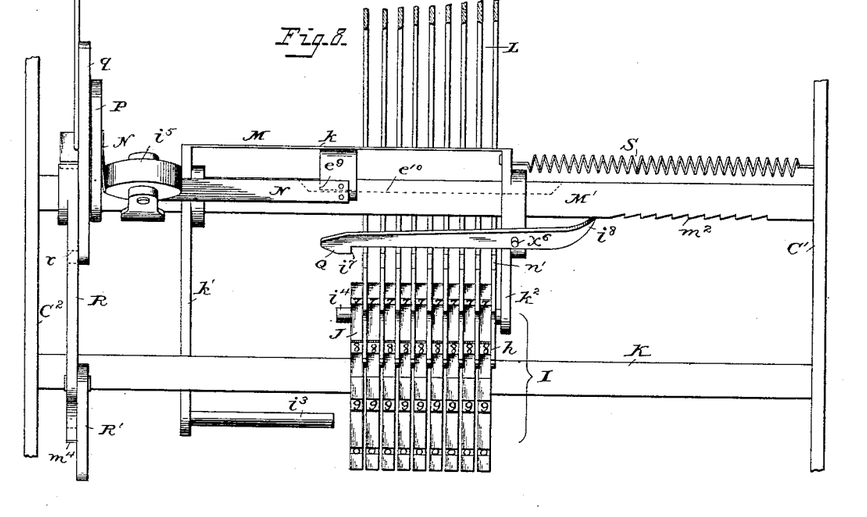
Figs. 8 and 9 are transverse elevations of part of the machine, looking in the direction of the arrow, Fig. 3, showing the parts in different positions.

To lock both the printing and non-printing wheels in position, I use a frame, M, Figs. 5, 8, and 9, sliding on a shaft, M', parallel to the shaft K, and consisting of a bar, $k$, and two arms, $k'$ $k^2$, of different lengths, connected by the bar, the bar carrying a feather, $e^9$, extending into a slot, $e^{10}$, in the shaft M', so that the frame will slide on and rock with said shaft. The arm $k'$ carries a rod, $i^3$, and the arm $k^2$ a rod, $i^4$, the rods projecting toward each other, their inner ends being nearly in the same vertical line, one rod, $i^4$, being above the horizontal plane of the shaft K, and the other, $i^3$, below, and so arranged that when the wheels J are turned to the position shown in Fig. 4 and the frame M is rocked forward in the direction of its arrow to the position shown in Fig. 5 the rod $i^4$ will pass into the V-shaped spaces or arms between the printing types or faces of the wheels opposite the rod $i^4$, and will hold them in position to print, while the swinging inward of the frame will carry the rod $i^3$ against the arms of the wheels opposite it, and will turn such as it makes contact with, to a slight extent and hold them in their non-printing position shown in Fig. 5.

It will be seen that by sliding the frame M above the recorder to such position that the rod $i^4$ will be opposite the wheels which are to print and the rod $i^3$ opposite the others, Fig. 9, and then rocking the shaft M', the rod $i^4$ will enter between the arms of the printing-wheels and lock them, while the arm $i^3$ will strike and turn the other wheels, so that they will not make printing contact with the slip, and only the figures required to make up the sum will be printed. It is of course necessary to move the frame M automatically to bring the pins $i^4$ $i^3$ opposite the proper wheels, and this may be effected from any moving part of the machine. One means is illustrated in the drawings. The frame M is drawn normally toward the right, Figs. 8 and 9, by a spring, S; but when the parts are in the position shown in Fig. 8 the frame is kept at the left by a connection between it and the rack-frame, said connection permitting the frame M to move under the action of the spring as the rack-frame is lowered. Thus a forked bar, P, Figs. 5, 8, and 9, receives between its prongs the shaft M' and slides thereon, and is slotted at the opposite end to receive a stud, $i^6$, upon the arm $D^2$, so that the latter can have a limited play independent of the bar. To one side of the bar is secured a band or strap, N, Figs. 4, 8, and 9, which passes round a guide-pulley, $i^5$, supported on the shaft M', and is connected to the center of the frame M.

To the frame M at $x^6$ is pivoted a pawl, Q, having a long arm with a projection or hook, $i^7$, Fig. 8, and a short arm, $i^8$, adapted to catch with a rack or series of teeth, $m^2$, on the shaft M'. The racks $h$ of the levers L have each a projection, $n'$, Figs. 7, 8, and 9, at the upper edge, so situated that when the parts are in the position shown in Fig. 9, the projection $i^7$ of the pawl Q will rest against the projections $n'$ and the pawl will slide with the frame over the racks. When any one or more of the racks are moved back by the action of the keys, the projections $n'$ of such racks pass from below the pawl, the long end of the latter drops, and the short end of the pawl at once engages with one of the teeth of the rack $n^2$, and further movement of the frame is prevented, while the arm $D^2$ can descend, owing to the travel of the stud $i^6$ in the slot of the bar P.

The ends of the rods $i^3$ $i^4$ are so arranged as respects the parts described that when the frame M is next rocked in the direction of its arrow, Fig. 5, the bar $i^4$ will lock all of the wheels at the right of and including that connected with the rack, the movement of which permitted the pawl to drop, while the rod $i^3$ will strike all the other wheels (which are not to do any printing) and turn them away from printing contact with the slip, as shown in Figs. 5 and 9.

The shaft M' and its frame M are rocked as the parts reach their lowest position by the contact of projections $p$ on the cam-levers E with arms $q$, projecting from the shaft M', as seen in Fig. 5. An arm, R, Figs. 3 and 11, carried by the shaft M', carries a pawl, R', having a shoulder, $x^7$, which, when the arm R swings forward, engages with a pin, $x^8$, on one of two arms, T, on a shaft, T', carrying between them a platen, U. A spring, $m^3$, lifts the platen, and the latter is depressed as the pawl R' descends until a stop, $m^4$, on the arm R strikes the pawl, when the latter will be carried from the stud $x^8$, and the spring $m^3$ will force the platen with a quick sharp blow against the slip of paper, between which and the wheels is carried the usual carbon ribbon. Any other inking means may be used. When the wheels from which no prints are to be taken are kept from printing contact with the slip by an intervening strip, or otherwise than by moving the wheels as above described, the rack-levers L may be connected rigidly to and form parts of the rack-levers B; but when it is necessary to move some of the wheels farther than others after the latter are set in place it is requisite to permit the rack-levers L $h$, connected with such wheels, to have slight movements independently of the levers B. To permit this I make the levers L and B separate, but connect them so that each pair will normally move together as one, but with a spring-connection which yields when it is necessary to move the levers L alone. This may be done in different ways. As shown, each lever L has an arm, $t$, Fig. 7, corresponding to an arm, $t'$, projecting from the adjacent lever B, and a lip, $t^2$, extends from the arm $t$ over the arm $t'$, and is held in contact therewith by a spring, $t^3$, which yields when the lever L is moved independently of the lever B, but normally keeps them in contact to move together.

Any suitable appliances may be used for throwing the printing devices out of operation. For instance, the platen-frame may be pushed down and secured, or the pawl R' may be turned out of operative position.

Figure 1:
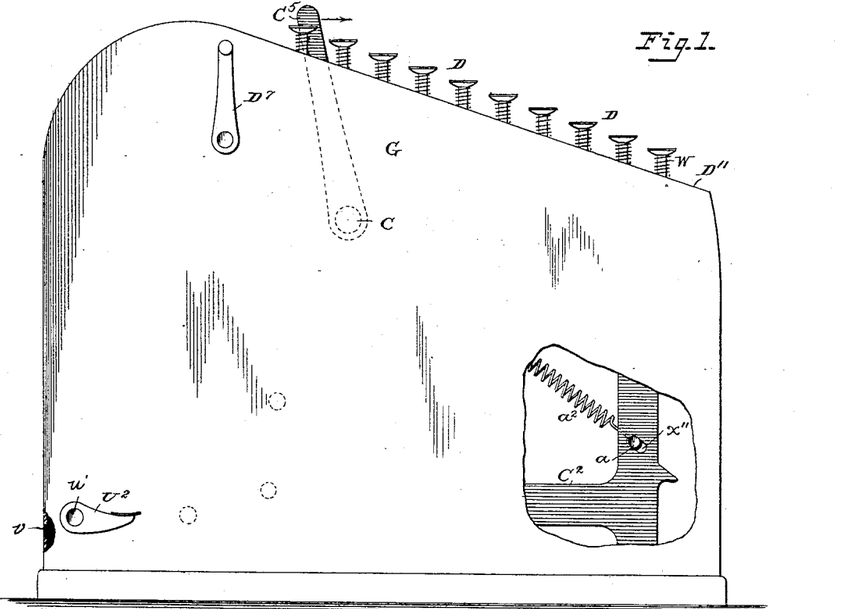
Figure 1 is a side elevation of the machine, part of the case broken away.

To avoid the necessity of using separate slips, I combine with the calculating-machine supports for a roll of paper, which is drawn forward between the printing-register and platen and through an opening, $v$, at the back of the machine, Fig. 1.

Any suitable feed devices are employed for feeding the paper after each sum is printed. Thus the paper passes between feed-rolls V V', Fig. 11, the lower carried by a spring-seated lever, $V^3$. To permit the ready detachment of the printed portion of the paper, I arrange a cutting-edge so that the paper may be severed thereby or torn therefrom. Thus I use a knife, $u$, Fig. 11, secured to a shaft, $u'$, having a handle, $U^2$, at the end outside of the case, Figs. 1 and 2, and I arrange a shoulder, $w'$, on the base of the machine, Fig. 11, so that the paper is bent down against the shoulder when the knife is depressed, a smart pull on the projecting end then separating the slip from the remainder of the roll along the line of the knife-edge.

Figure 11:
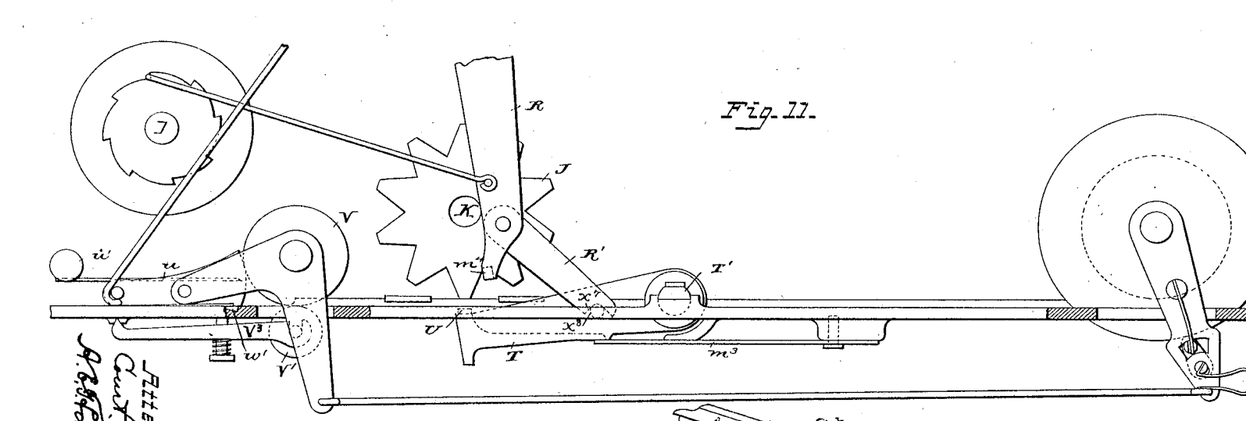
Fig. 11 is a side view mainly of the printing devices.

Devices are used for feeding the inking-ribbon back and forth—as, for instance, the devices shown in Fig. 11, consisting of two bobbins for carrying the inking-ribbon and a vibrating arm with a pawl for engaging with the edge of one bobbin. These need not be here further described, as they constitute the subject of a separate application for Letters Patent, Serial No. 255,923, filed November 22, 1887.

It will be seen that in the machine above described the wheel-actuating connections or devices are operated positively—that is, by the direct application of power. It is not essential, however, to limit the motion of the wheel-operating devices precisely as described. For instance, the stops may be set so as to vary the movements of the racks or their equivalents after they have been thrown into connection with the wheels, the latter being then turned to different degrees as the racks are moved positively by the operator.

Instead of printing from a register consisting of a series of wheels moved by the racks $h$, the figures or types may be upon the racks and the paper may be printed from the latter.

It will be evident that the wheels of the printing register may be kept normally in printing position by other means than the rod $i^4$, and that the rod $i^3$ may be used without the rod $i^4$ to turn or keep out of printing position such wheels as are not to make any record.

I have referred to the register H as a "sight" register mainly to distinguish it from the recorder; but it need not necessarily be exposed to observation, as in many instances the recorder affords all the record needed.

The bars $i^3$ and $i^4$ of the rocking and sliding frame M may be the means either of setting the printing-wheels into position or the non-printing wheels out of position, and the bars, instead of being carried by a sliding frame, may slide in a frame which vibrates only.

It will be seen that in operating the above-described devices the effect of depressing the keys is simply to set the stops, and that when the operating-lever $C^5$ is drawn forward in the direction of its arrow, Fig. 1, the wheels A are not turned, the racks simply being brought to different positions determined by the arrangement of their stops, and that the wheels A are then turned upon the upward movements of the racks resulting from pushing back the handle $C^5$, according to the extent to which their respective racks will be pressed on the forward movement of the handle.

It will also be seen that the carrying action is effected by imparting automatically slight additional movements to the rack-levers, thus dispensing with the necessity of using the complex devices necessarily employed in such constructions as are illustrated in my aforesaid application.

It will further be seen that as the stops $c$ are all set in position before the connections with the register-wheels A are operated any error in striking the keys may be corrected before any effect is produced on the register, it being necessary only to restore the stops to their normal positions, and then restrike the keys. Different means of restoring the stops will suggest themselves to any mechanic. One consists in moving forward the rod $e$ and thereby carrying forward all the bars $D^4$. The forward movement of the rod $e$ may be effected by operating the handle $D^7$, as before described; but as this would carry the hand away from the keys and interfere with rapid manipulation, I provide an operating-key, W, Figs. 1, 2, 3, 4, and 5, near the front of the machine, where it can be readily pressed by the thumb. To transfer the motion of the key W to the rod $e$, I use a lever, W', Fig. 5, and a rod, $w^2$, connected to the lever and to the rod $e$, as shown. (See Fig. 12.)

It will be evident that the racks may be guided to operate the wheels in any suitable manner—as, for instance, the racks may be straight and slide in guides with suitable connections with the operating devices.

An important feature of the machine described is the direct moving of the racks by power; but it is not essential to use a hand-lever, as a crank-arm, rod, and foot-treadle may be used; or a spring or other motor may be thrown by any hand device into and out of connection with the racks to operate the latter.

It will be evident that the levers B may gear directly with the register or carrying wheels or indirectly through other gears or devices.

I do not limit myself to the precise construction of operating-frame connected with the operating rock-shaft and serving to raise and depress the racks, as differently-constructed frames or other restoring devices for carrying the wheel-operating devices simultaneously instead of successively to normal position may be used.

It will also be evident that different yielding connections between the frame and the racks may be used for carrying each rack with the frame only until it is arrested by a stop.

I do not here claim any features shown and also shown and claimed in my applications for Letters Patent Serial No. 152,485, filed January 10, 1885, No. 174,593, filed July 8, 1885, and Serial No. 256,566, filed November 30, 1887; nor do I here claim the printing devices herein described, which constitute the subject of a separate application for Letters Patent, Serial No. 278,907.

Without limiting myself to the precise construction and arrangement of parts shown, I claim—

1. The combination of a series of register-wheels, a series of keys to each wheel, a separate stop connected to be set by each key, and connections between each wheel and its stops, constructed to turn the wheels and arranged to be moved by hand each to an extent determined by the position of one of the stops, substantially as described.

2. The combination, with the registering-wheels and a series of independent keys to each wheel, and intermediate wheel-operating devices, of a series of stops and connections between each series of keys and each stop, substantially as described, whereby the stops are set in different positions on operating the keys to vary the extent to which the wheels may be thereafter turned by the operating devices, substantially as described.

3. The combination, with the series of keys and independent registering-wheels of a mechanical calculator, one wheel to each series of keys, of regulators for regulating the turning of each wheel and operating devices between the keys and said regulators, whereby the parts of the latter are set in different positions prior to the said devices being operated to turn the wheels, substantially as described.

4. A mechanical calculator provided with a series of register-wheels and independent stops and with series of keys, and connections for setting the stops in different positions prior to turning the wheels, whereby each wheel is turned to an extent according to the position to which its stop is set prior to turning the wheel, substantially as described.

5. The combination, with the independent register-wheels of a mechanical calculator, of a series of keys and a series of stops connected to be adjusted by each series of keys, wheel-operating devices for turning each wheel, governed in extent of movement by the stops, and an adjustable carrier for throwing the wheels into and out of connection with the turning devices, substantially as described.

6. The combination, with the independent register-wheels, series of independent keys and connections, and wheel-actuating devices for operating the wheels from the adjustment of the keys, of a restorer for restoring said connections simultaneously to normal position, substantially as described.

7. The combination of the register-wheels and their operating devices, keys, and stops, and register-carrier, and carrier-moving devices, substantially as described, for throwing the wheels out of connection with said devices when they are being set and into connection therewith, and for simultaneously restoring the devices to normal position, substantially as described.

8. The combination, with the independent register-wheels, a series of stops to each wheel, and wheel-operating devices between each series of stops and each wheel, and keys adjustable independently of the stops, of a movable register-carrier and actuating devices, substantially as described, whereby the wheels and operating devices are automatically thrown out of connection before the devices are set and then are thrown into connection, substantially as described.

9. The combination of the register-wheels, a series of independent keys to each wheel, intermediate wheel-operating devices, and a single handle for moving all the wheel-operating devices simultaneously, substantially as described.

10. The combination, with the register-wheels, racks for rotating them, a lever for moving the racks while in gear with the wheels, a series of stops for arresting the movement of each rack, and a series of keys to each rack, whereby the different stops are moved, substantially as described.

11. The combination of the register-wheels, operating-racks, stops which may be adjusted to limit the movement of each rack, and appliances for throwing the wheels and racks out of gear while the racks are being set in position, substantially as described.

12. The combination of the series of register-wheels and a series of racks gearing therewith, a hand-lever whereby to move the racks to turn the wheels, and appliances for putting the wheels into and out of operative connection with the racks, substantially as described.

13. The combination, with the register and series of operating-levers, of a series of retainers for supporting the levers in their normal position without interfering with their further upward movement, a detent for holding each lever against such upward movement, and an actuating device connected with each lever and between such lever and the detent of the adjacent lever, for transferring motion to said detent, substantially as described.

14. The combination of the series of register-wheels, a series of keys to each wheel, a rack-lever constructed to turn each wheel, appliances for applying power to raise and lower the rack-lever, and a series of stops adapted to be arranged in different positions to define the movements of each lever, and connections between each series of stops and one of the series of keys, substantially as described.

15. The combination of the register-wheels, wheel-operating devices, means for throwing the said devices and register into and out of connection, and retainers for retaining said devices in one position, series of stops, a series of keys to each series of stops, and connections independent of the stops between each series of keys and one of the retainers, whereby the latter may be moved by the movement of any key of the series, substantially as described.

16. The combination, with the series of wheels, keys, and wheel-operating devices, of stops for limiting the movements of said devices, a retainer for holding each device in its normal position, a series of keys, and connections independent of the stops, whereby each retainer may be operated by any key, and a restoring device whereby all the retainers are returned to position simultaneously, substantially as described.

17. The combination, with the stops and keys, of independent levers connected to the stops, and a spring interposed between each lever and a bearing to retain the lever in whichever position it is set and prevent its ready displacement, substantially as described.

18. The combination, with the keys, stops, levers, and connections between the levers and stops, of independent bars having connections with each key of the series, and appliances for moving all the bars simultaneously to restore the parts to position, substantially as described.

19. The combination of a series of keys and springs for lifting the same, levers, stops, and connections between each lever and its stop, a bar having bearings for moving the levers simultaneously in one direction, and a spring having its bearing on each lever and holding it to either position to which it is set by the key or bar, substantially as described.

20. The combination, with the series of independent racks and stops, of an operating-frame and yielding connections between each rack and the frame, whereby the latter may be moved with some of the racks upon the motion of other racks having been arrested, substantially as described.

21. The combination of the racks having bearings and a rack-operating frame provided with arms D', carried by the frame, and springs for holding the arms in frictional contact with the bearings on the racks, substantially as described.

22. The combination of the racks having bearings, an independent retainer for each rack, and an operating-frame having parts bearing frictionally on the bearings of the racks, substantially as described.

23. The combination of the racks and an operating-frame carrying arms D', said arms having shoulders, and springs arranged to force each arm against a bearing on the adjacent rack, substantially as described.

24. The combination of the racks and means for moving them positively, and a register having a wheel engaging with each rack, and devices whereby each register-wheel is automatically moved out of connection with each rack prior to the movement of the latter in one direction and all the wheels are put into gear with all the racks upon the reverse simultaneous movement of all the racks, substantially as described.

25. The combination, with the racks and register, of a frame and yielding connections between the latter and the racks, and devices connected with the frame and the register, whereby the register and racks are thrown out of gear on the movement of the frame in one direction, substantially as described.

26. The combination of the racks, the rack-operating frame connected to have a limited movement independently of the racks, a register constructed to be operated by the racks, and connections whereby the register and racks are thrown out of gear on the movement of the frame in one direction, substantially as described.

27. The combination of the movable register and carrier, and rack-operating frame having cam-edges, the register-carrier having arms bearing on said cam-edges as the frame moves in one direction, and capable of being turned away from the frame as the latter moves in the opposite direction, substantially as described.

28. The combination of the keys, register, and carrier therefor, and the operating-racks and the series of stops to each rack, whereby to permit the racks to be moved in one direction independently of the register to positions determined by the stops, and to then all simultaneously move in the other direction in connection with the register, substantially as described.

29. The combination of the series of racks, register, rack-frame constructed to throw the register-wheels into and out of connection with the racks, a catch for holding the frame, and appliances for moving the catch as the rack-frame descends, substantially as described.

30. The combination of the wheels A, the rack-levers provided with studs $a^3$, and the levers $D^2$, carrying the arms D', each arm having a shoulder, $y$, and a spring for throwing out each arm, substantially as described.

31. The combination of the racks, the rack-frame provided with cam-edges 2 3 4, the register having wheels A, a shaft, $a$, sliding bearings for said shaft, and arms $a^3$, arranged to bear on the said cam-edges, and a stop limiting the turning of the arms in one direction, substantially as described.

32. The combination, with the register-wheels and pins and operating-racks and series of keys, of detents supported by the main frame and arranged to contact with and limit the movements of the said racks, and in position to contact with the pin of the adjacent wheel as the latter completes a revolution, and a motor whereby each rack is moved one step when released by the action of the adjacent wheel, substantially as described.

33. The combination, with the series of keys and wheels of a register and with racks turning the same, of a series of stops to each rack, detents supported independently of the racks and limiting the normal movement of the racks, and devices whereby each stop is displaced to permit the rack to move one step whenever the adjacent wheel moves beyond a complete revolution, substantially as described.

34. The combination of the series of racks, series of detents suspended from fixed supports, and register-wheels, each provided with a pin arranged to make contact with and move one of said detents out of position as the wheel completes a revolution, and the series of motors for moving the racks, substantially as described.

35. The combination of the racks and pins $b^2$, suspended forked detents, and register-wheels having pins $w$, substantially as described.

36. The combination of the register-wheels and racks for moving them, of detents supported independently of the racks for limiting the movement of the racks, and appliances for moving said detents while the wheels are being moved by the racks, substantially as described.

37. The combination, with the register-wheels, racks, stops, and devices for moving the racks positively to their normal positions, of detents suspended from fixed bearings for arresting the racks, keys, and connections for setting the stops, devices whereby each detent is moved out of position as each wheel completes a revolution, and independent motors for moving each rack when released by the detent, substantially as described.

38. The combination of the register-wheels, racks, detents suspended independently of the racks, rack-moving frame, and springs arranged to move the racks independently of the frame, substantially as described.

39. The combination of the wheels and pins $w$, the rack-moving frame, racks and spring-motors, and detents having inclined edges arranged to be struck by the pins $w$, substantially as described.

40. The combination, with the register H, keys and connections, and racks and power devices for moving them, and motors for moving them independently of the power, and a printing-recorder having wheels connected to be operated by the said racks, substantially as described.

41. The combination, with the sight-register H, keys and connections, and racks and power devices for moving them, and motors for moving the racks independently of the power, and a recorder having wheels, and connections whereby said recorder is operated by the said racks, substantially as described.

42. The combination of the shaft C, registers H, recorder J, rack-levers L and B, and yielding connections between the levers, substantially as described.

43. The combination, with the register H, recorder J, and a device for turning some of the wheels of the recorder, of rack-levers B L and yielding connections between the same, substantially as described.

44. The combination, with the recording-wheels, register-wheels, detents, and connections, of an adjustable support for the register-wheels, and an operating-lever, $C^5$, and intermediate devices whereby the movement of the lever serves to throw the register in and out of operation with the connections, substantially as described.

45. The combination, with the register-wheels A, pins $w$, and operating-racks, and means for throwing the racks and wheels into and out of connection, of detents F, hung to fixed supports and provided with bearings for the racks, and with inclined edges and shoulders for engaging the pins $w$, substantially as described.

46. The combination, with the register H and actuating devices, and automatic appliances for throwing them into and out of gear, and hand appliances for also throwing them into and out of gear, substantially as described.

47. The combination, in a mechanical calculator, of series of keys and connections between each series of keys, and a regulator having a series of stops, whereby the latter may be set by the keys to determine the positions to which the parts shall be subsequently moved to set the register, substantially as described.

48. The combination of series of keys, stops, and their connections, a register, and devices which are brought against the stops to set the register, and a restoring device whereby all the keys may be set to their normal positions before the register is moved, substantially as described.

49. The combination of the keys, independent levers, stops, and connections between the levers and stops, and devices whereby the levers may all be brought to their normal positions after being set by the keys, substantially as described.

50. The combination, with the keys, stops, registers, and actuating devices, of a key, W, arranged upon the key-board and connected with the stops to reset the same, substantially as described.

In testimony whereof I have signed my name to this specification in the presence of two subscribing witnesses.

WILLIAM S. BURROUGHS.

Witnesses:
CHARLES E. FOSTER,
A. E. T. HANSMANN.